United States Patent [19]

Salisbury

[11] Patent Number: 4,470,735
[45] Date of Patent: Sep. 11, 1984

[54] SELF-LOCKING BOLT

[75] Inventor: Charles E. Salisbury, Glastonbury, Conn.

[73] Assignee: United Technologies Corporation, Hartford, Conn.

[21] Appl. No.: 333,080

[22] Filed: Dec. 21, 1981

[51] Int. Cl.³ .............................................. F16B 21/18
[52] U.S. Cl. .................................. 411/353; 411/272; 411/517
[58] Field of Search ............... 411/247, 248, 249, 250, 411/260, 272, 301, 302, 303, 324, 352, 353, 517, 518, 520, 521, 530

[56] References Cited

U.S. PATENT DOCUMENTS

| 1,427,313 | 8/1922 | Morse | 411/324 |
| 2,898,081 | 8/1959 | Johnson | 411/517 X |
| 3,812,756 | 5/1974 | Wenger | 411/353 |
| 4,274,460 | 6/1981 | Egner | 411/353 X |

FOREIGN PATENT DOCUMENTS

| 1393257 | 5/1975 | United Kingdom | 411/301 |
| 720212 | 3/1980 | U.S.S.R. | 411/324 |

Primary Examiner—Thomas J. Holko
Assistant Examiner—Adrian Whitcomb
Attorney, Agent, or Firm—Norman Friedland

[57] ABSTRACT

A snap ring cooperating with a double acting cam provided by a land formed on the shank of the bolt serves to lock the bolt into place and requires a positive predetermined torque to retract the bolt.

2 Claims, 5 Drawing Figures

SELF-LOCKING BOLT

CROSS REFERENCE

This invention is related to the invention described in copending patent application Ser. No. 333,082 entitled SELF-LOCKING BOLT, filed by Fred R. Safford and Charles E. Salisbury on even date and assigned to the same assignee of this application.

TECHNICAL FIELD

This invention relates to bolts and particularly of the type that are self-locking.

BACKGROUND ART

As is well known, in the aircraft engine art, bolts used as borescope plugs, drain fittings, chip detectors and the like are secured into place by a variety of positive type locking devices. As for example, bolts can be secured with lockwire, tab washers, threaded inserts and the like. Such devices are in some instances unreliable and in some others impractical or impossible to use.

I have found that I can obviate the problems noted above by utilizing a snap or split ring as the self-locking feature and judiciously locating a land on the shank of the bolt that requires the snap ring to be expanded, by the removal of the bolt, a predetermined torque before the bolt can be retracted fully.

DISCLOSURE OF INVENTION

The object of this invention is to provide for a bolt utilized as a borescope plug, drain fitting and the like, improved locking means. A feature of this invention is to provide a land on the shank of the bolt that engages a split ring that exhibits a dual camming action which (1) loads the bolt in position and (2) requires a predetermined torque to retract the bolt.

Other features and advantages will be apparent from the specification and claims and from the accompanying drawings which illustrate an embodiment of the invention.

BEST MODE FOR CARRYING OUT THE INVENTION

Figure 1:
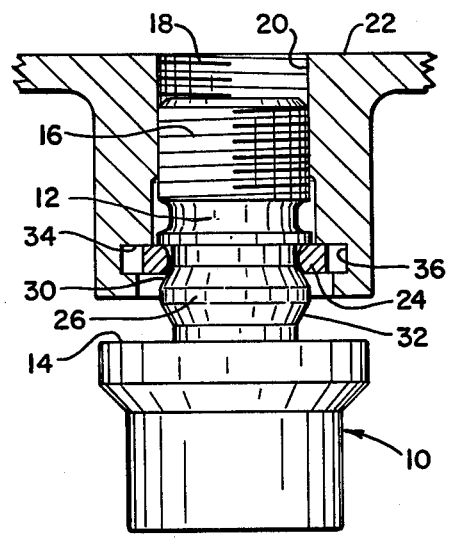
FIG. 1 is a sectional partial view showing the invention utilized as a plug in a boss that exemplifies a borescope plug for a gas turbine engine.
Figure 2:
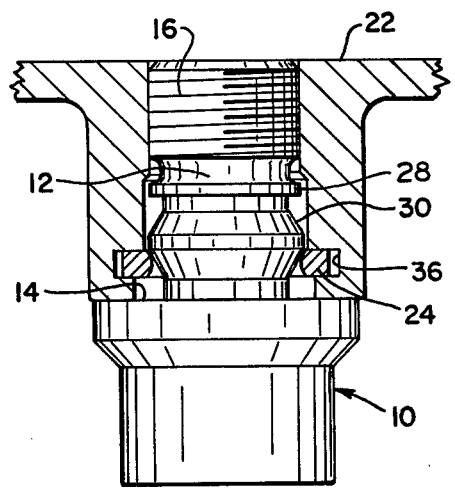
FIG. 2 is a sectional partial view identical to FIG. 1 with the plug in the inserted position.

While shown in its preferred embodiment as being a plug inserted into a boss, it will be understood that this bolt has other uses and is not limited thereto. Referring to FIGS. 1 and 2 the bolt 10 has a shank portion 12, a shoulder 14, and a threaded portion 16 adapted to be threadably engageable with threaded portion 18 formed in the bore 20 of boss 22.

According to this invention snap or split ring 24 is loosely fitted to shank 12 and is retained in position by land 26 and the small shoulder 28. Land 26 is designed to have a double cam action by bevel face 30 and the opposite bevel face 32.

As noted in FIG. 1, in the partially retracted position, the outer diameter of snap ring 24 abuts against shoulder 34 formed on the inner diameter of bore 20. Further tightening of bolt 10 translates the shank 12 and hence land 26 causing the face 30 to expand snap ring 24 into groove 36 formed in the wall of boss 22. Additional threading of bolt 10 seats shoulder 14 against the top face of boss 22 locating the face 32 of land 26 to bear against the inner diameter of ring 24 to partially expand the ring 24 to hold it into groove 34 at a predetermined tension for locking the bolt into position.

Retracting bolt 10 obviously requires a predetermined torque to overcome the forces produced by the camming action of face 32 on ring 24. As noted snap ring 24 has to be further expanded in order to be fully retracted.

Figure 3:
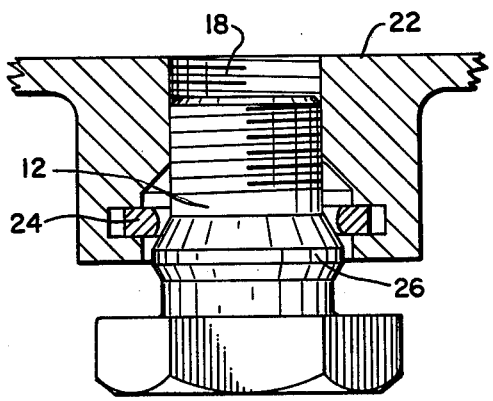
FIG. 3 is a sectional view of another embodiment of the invention.

FIG. 3 is the identical bolt with a modified head (which can take the form of a conventional hexagon head) and snap ring configuration but is modified so that the snap ring is retained in recess 36 instead of on bolt 10.

Figure 4:
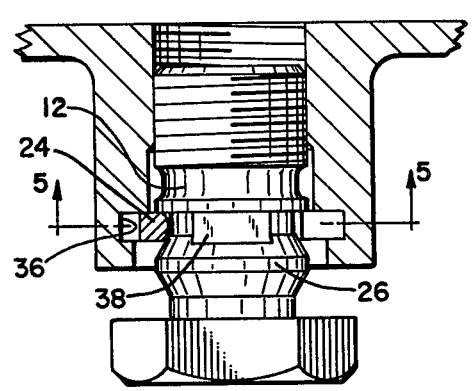
FIG. 4 is another embodiment of the invention.
Figure 5:
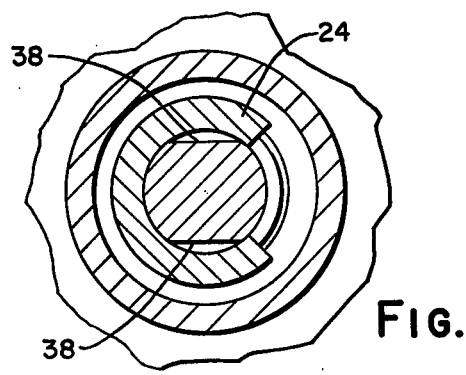
FIG. 5 is a sectional view taken along lines 5—5 of FIG. 4.

FIGS. 4 and 5 show the same embodiment as that depicted in FIG. 1 where diametrically deposed slots 38 are machined in the shank 12 intermediate the threaded portion and land 26. Because the snap ring 24 is attached to the bolt, as the bolt is threaded into its deployed position and before the land engages the snap ring, the space provided by slot 38 allows the threading to occur with minimum radial deflection of the ring.

It should be understood that the invention is not limited to the particular embodiments shown and described herein, but that various changes and modifications may be made without departing from the spirit and scope of this novel concept as defined by the following claims.

I claim:

1. A retractable self-locking bolt having a shank portion and a head portion, the end of said shank portion remote from said head being threaded to engage a threaded receptacle intended to be plugged by said bolt, a land extending radially from said shank intermediate said head and said threaded portion having a double faced cam portion each being axially spaced, a split ring cooperating with said double faced cam portion that engages the first face of said cam to position a portion of said split ring into an annular recess formed in said receptacle when the bolt is partly threaded in said receptacle, and engaging said other face of said cam portion when said head is seated into the locked position, said split ring being flexible and resilient to load said bolt in the locked position by said cam face so that a predetermined torque is required to overcome the force exerted by the split ring acting on said cam portion required to move said split ring off of said cam portion and an annular shoulder spaced from said land for preventing said split ring from sliding off of said shank and the diameter of said split ring being larger than the diameter of said shank so that it is loosely retained on said shank between said shoulder and said land.

2. A retractable self-locking bolt as in claim 1 including a lateral slot formed in said shank intermediate said land and said annular shoulder so that the radial deflection of said ring is minimized when said bolt is being threaded into said receptacle.

* * * * *